(12) United States Patent
Andreu et al.

(10) Patent No.: US 8,744,270 B2
(45) Date of Patent: Jun. 3, 2014

(54) AVIONICS EQUIPMENT WITH OPTICAL CONTACT AND AVIONICS SYSTEM COMPRISING SUCH EQUIPMENT

(75) Inventors: Jean-Pierre Andreu, Toulouse (FR); Joseph Rival, Villemur sur Tarn (FR)

(73) Assignee: Airbus Operations (S.A.S) (FR)

( * ) Notice: Subject to any disclaimer, the term of this patent is extended or adjusted under 35 U.S.C. 154(b) by 319 days.

(21) Appl. No.: 12/742,006

(22) PCT Filed: Oct. 30, 2008

(86) PCT No.: PCT/FR2008/051961
§ 371 (c)(1),
(2), (4) Date: Aug. 16, 2010

(87) PCT Pub. No.: WO2009/060153
PCT Pub. Date: May 14, 2009

(65) Prior Publication Data
US 2011/0200336 A1 Aug. 18, 2011

(30) Foreign Application Priority Data
Nov. 8, 2007 (FR) ...................................... 07 58886

(51) Int. Cl.
*H04B 10/12* (2011.01)
(52) U.S. Cl.
USPC ............ 398/141; 398/164; 398/139; 398/138

(58) Field of Classification Search
USPC ......... 398/135, 138, 139, 164, 141, 128, 130, 398/140
See application file for complete search history.

(56) References Cited

U.S. PATENT DOCUMENTS 5,068,847 A * 11/1991 Stout ............................... 398/60
7,371,014 B2 * 5/2008 Willis et al. ..................... 385/89

FOREIGN PATENT DOCUMENTS

FR 2890275 A1 * 3/2007

OTHER PUBLICATIONS

International Search Report and Written Opinion dated Mar. 25, 2009.

* cited by examiner

*Primary Examiner* — M. R. Sedighian
(74) *Attorney, Agent, or Firm* — Lerner, David, Littenberg, Krumholz & Mentlik, LLP

(57) ABSTRACT

An avionics device able to be installed on board an aircraft, including means of processing information and a connector able to receive and/or transmit information, the aforementioned connector including an electrical coupling interface able to transmit and/or receive information in the form of electrical signals, and an electro-optical connection interface able to convert electrical signals into optical signals and to transmit information in the form of optical signals and/or receive information in the form of optical signals and convert these optical signals into electrical signals.

7 Claims, 2 Drawing Sheets

AVIONICS EQUIPMENT WITH OPTICAL CONTACT AND AVIONICS SYSTEM COMPRISING SUCH EQUIPMENT

CROSS-REFERENCE TO RELATED APPLICATIONS

This application is the National Stage of International Application No. PCT/FR2008/051961 International Filing Date, 20 Oct. 2008, which designated the United States of America, and which International Application was published under PCT Article 21 (s) as WO Publication No. WO 2009/060153 A1 and which claims priority from, and the benefit of, French Application No. 200758886 filed on 8 Nov. 2007, the disclosures of which are incorporated herein by reference in their entireties.

The aspects of the disclosed embodiments concern an avionics device able to transmit and receive information in the form of optical signals. The disclosed embodiments also concern a data transmission system allowing the preceding avionics devices, installed on board an aircraft, to be linked by means of a network of optical communication buses.

The disclosed embodiments find applications in the field of aeronautics and, in particular, in the field of communication between avionics devices.

BACKGROUND

Current civil aircraft make widespread use of digital technologies. Various devices comprising an electronic communication interface, such as processors or other devices equipped with microprocessors or microcontrollers, ensure functions of command, control and surveillance on board aircraft. These devices exchange information, or data, by means of digital buses.

The buses used most are electrical buses. These electrical buses comprise cables having a metal conductor core, generally made from copper or aluminum. The digital data are then sent in the form of electrical voltage changes. The technology of the electrical buses, in particular the serial bus where the coded information is sent successively on the same physical medium, is justified in particular by the reliability of the means of connection which are, on board aircraft, subjected to severe operational environments. However, these electrical buses have the drawback of being relatively heavy and of being sensitive to electromagnetic disturbances.

The need, especially for operational reasons of interchangeability, a high level of stability in the specifications of the devices utilized on board aircraft, in particular with respect to their physical and functional interfaces, has led aircraft manufacturers to standardize the mechanical and electrical interfaces of these devices.

Standard ARINC 429, which defines, in detail, the communication protocols and interfaces between the devices on board aircraft by means of one-way buses that meet this standard, is well known to the aeronautical world, for instance.

More recently, simplifying electrical buses has been made possible by the increase in speeds that these buses are now able to support, with the reliability conditions necessary for aeronautical applications. In this way, several relatively low-speed one-way buses used in systems complying with standard ARINC 429 can be replaced by one high-speed two-way bus, for example 100 Megabits per second. These high-speed two-way buses are associated with new standards and, as a result, new communication interfaces for the avionics devices.

Currently, these new interfaces are always associated to electrical communication buses, for the reasons of operational reliability already mentioned.

FIG. 1 shows an architecture example of on-board electronic devices, linked by high-speed electrical buses. In this example, processors 1a, 1b, 1c are linked by electrical communication buses, 4a, 4b, 4c respectively, to a commutator 2. This commutator 2 is a standard device able to make the signals pass from one bus to another bus, depending on address signals that arrive over the bus itself. Other devices 3a, 3b, for example sensors or actuators, are linked directly to the processors, 1a, 1b respectively, by means of electrical communication buses, 5a, 5b respectively.

The simultaneous two-way electrical communication buses, called Full-Duplex buses, are generally constituted of two pairs of electrical conductors, or cables (called quad-raxial), each pair being dedicated to one communication direction. In general, each pair is twisted. A bus thus constituted comprises a shielding intended, on the one hand, to protect the cables from electromagnetic attacks from the exterior and, on the other hand, to protect the exterior environment from electromagnetic rays that may be emitted by the cables.

These cables frequently have a mass per unit length of 40 to 50 g/m.

Each bus is equipped, at each of its ends, with a connector, male or female as needed, comprising four electrical contacts and having a shielding connection on the metal structure of said connector. Standard ARINC 600 describes the electrical and mechanical characteristics of such a quadraxial type of connector. In such a connector with 4 electrical contacts, the two contacts dedicated to transmission are generally identified as Tx+ and Tx− and the two contacts dedicated to reception are generally identified as Rx+ and Rx−. The + and − signs of these identifications indicate that the bus is polarized and this polarity must be respected when the connectors are fitted on the electrical cable of the bus.

In recent years, optical means of sending information have been developed. The information to be sent is converted into optical signals that can be propagated in optical fibers. The communication buses sending such optical signals are called optical buses. They present advantages in terms of mass per unit length, speed of information and insensitivity to electromagnetic rays. However, they are still not widely used in the field of civil transport aircraft, because of problems connecting optical links onto current avionics devices. In effect, current avionics devices are equipped with interfaces for coupling electrical buses and the optical buses are equipped at their ends with optical connectors. An optical bus cannot, therefore, be connected to a current avionics device.

SUMMARY

The purpose of the disclosed embodiments is to remedy the drawbacks of the techniques described previously. To do this, the disclosed embodiments propose an avionics device able to transmit or receive, by means of a network of optical communication buses, information in the form of optical signals. This device, designed initially to operate with electrical communication buses, is able to transmit and/or receive information in the form of optical signals, which makes it possible for the aircraft to benefit from the advantages of optical communication in terms of mass and insensitivity to electromagnetic disturbances. This device solves the particularly critical problems, for aircraft, of mass and sensitivity to electromagnetic disturbances of electrical communications, without calling into question the existing specification of current avionics devices that respond, and must still respond for several more years, to standards that correspond to electrical communication buses.

More precisely, the disclosed embodiments concern an avionics device able to be installed on board an aircraft, comprising:
means of processing information, and
a connector able to receive and/or transmit information, characterized in that the connector comprises:
an electrical coupling interface able to transmit and/or receive information in the form of electrical signals, and
an electro-optical connection interface able to convert electrical signals into optical signals and to transmit information in the form of optical signals and/or receive information in the form of optical signals and convert these optical signals into electrical signals.

The disclosed embodiments can further comprise one or more of the following characteristics:
the electro-optical connection interface comprises a means of electrical coupling able to be inserted into the coupling interface, a means of optical contact able to be connected to means of optical communication, and at least one electro-optical converter able to convert the electrical signals into optical signals and/or the optical signals into electrical signals.
the means of optical contact is integrated into a plug also comprising means of electrical contact.
the electro-optical converter comprises at least one component converting the electrical signal into an optical signal.
the electro-optical converter comprises at least one component converting the optical signal into an electrical signal.
the electro-optical converter comprises at least one optical element able to separate an information transmission channel from an information reception channel.
the electro-optical connection interface comprises means for being powered by an external energy source.

The system also concerns an avionics system installed on board an aircraft, comprising at least a first device and a second device conforming to any one of the preceding claims, characterized in that it comprises at least one optical communication bus equipped, at each of its ends, with an optical connection plug and able to connect the first and second devices.

This system can also comprise the following characteristics:
at least one of the connection plugs of the optical bus is fitted in an internal connection unit equipping a reception cradle of a device.

The disclosed embodiments further concern an aircraft comprising at least one avionics device as described above.

DETAILED DESCRIPTION

The disclosed embodiments concern an avionics device intended to be installed on board an aircraft. This device is designed to be linked to other devices of the aircraft, by means of a communication bus network comprising at least one digital optical bus.

Figure 1:
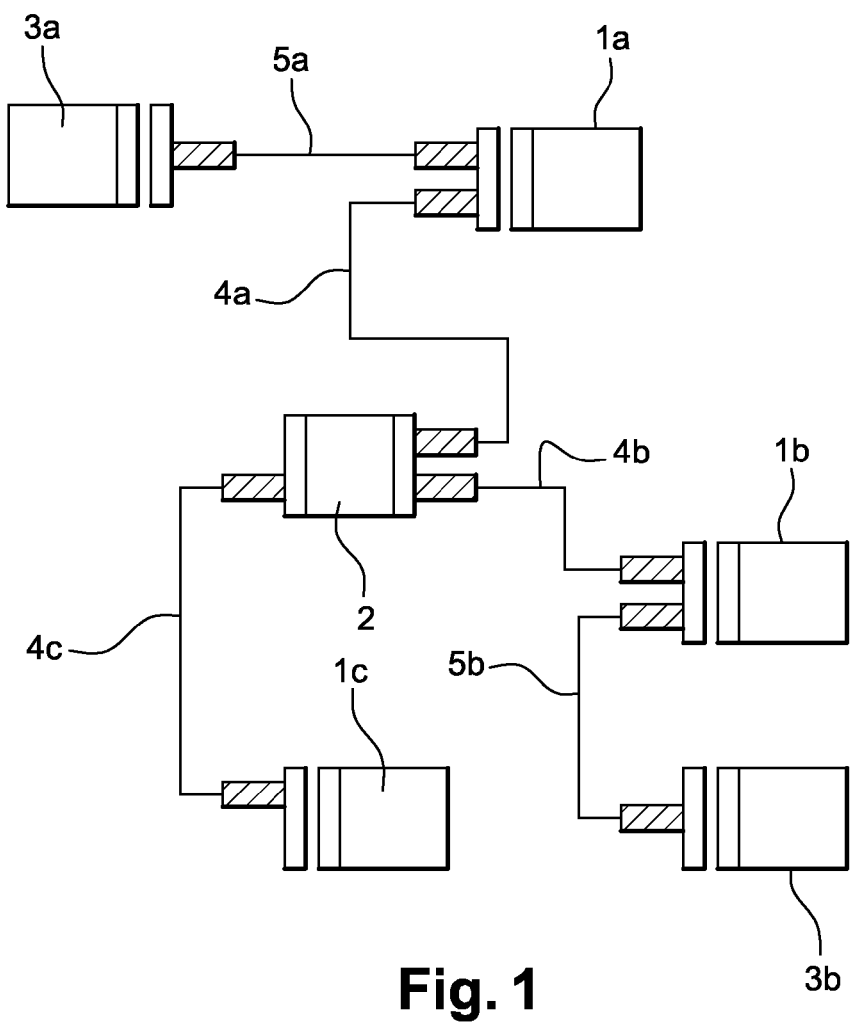
FIG. 1, already described, represents a network of electrical communication buses according to the prior art.
Figure 2:
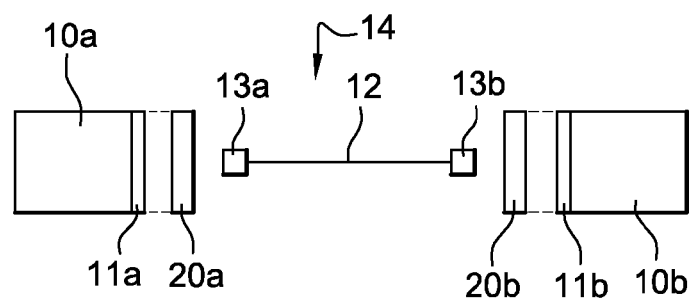
FIG. 2 represents an example of an avionics system equipped with a network of optical communication buses and devices according to the disclosed embodiments.

An example of a system comprising two avionics devices is shown in FIG. 2. In this example, the devices 10a, 10b communicate with each other by means of an optical communication bus 14.

The devices 10a and 10b can be of any kind but, regardless of their type, they are able to transmit and/or receive digital information. These devices can be, for example, processors carrying out more or less complex operations relating especially to piloting, carrying out the mission or monitoring the aircraft, or sensors or sensor measurement concentrators, actuators, devices specific to the communication bus network such as electronic commutators or electronic routers.

Each of these devices 10a, 10b has at least one interface for coupling buses, 11a, 11b respectively. Each coupling interface 11a, 11b comprises at least one electrical socket (for example, quadraxial type for full-duplex buses) allowing it to be coupled to at least one electrical communication bus carrying out information exchanges with one or more other devices.

In the present architecture, regardless of coupling interfaces 11a, 11b that are specified so that these devices 10a, 10b are linked by electrical communication buses, the link allowing information to be exchanged between the devices 10a and 10b is realized by means of an optical communication bus 14, also called an optical bus. This optical bus 14 comprises an optical cable 12 equipped, at each of its ends, with an optical connection plug 13a, 13b. Each optical connection plug comprises optical contacts able to send the information carried by the bus to a complementary optical connector.

In this architecture, the devices 10a, 10b are each provided with an interface 11a, 11b for coupling electrical communication buses, more simply called a coupling interface. They are further equipped with an electro-optical connection interface 20a, 20b able, firstly, to be coupled to the coupling interface 11a, 11b and, secondly, to receive the optical connection plug 13a, 13b of the optical bus 14.

The electro-optical connection interface 20a, 20b, more simply called a connection interface, carries out the conversion of electrical signals into optical signals for information sent by a device to the optical bus and the conversion of optical signals into electrical signals for information sent by the bus to a device.

Figure 3:
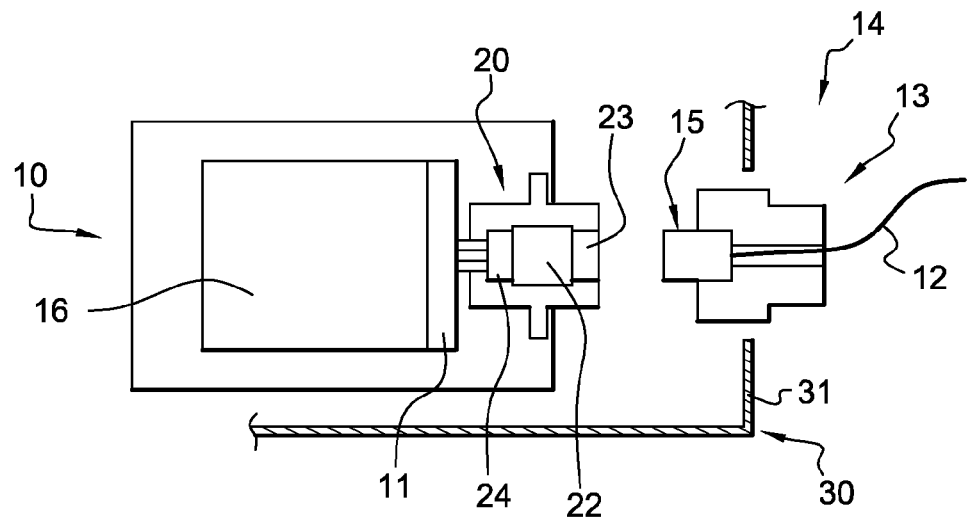
FIG. 3 represents an example of an avionics device complying with the disclosed embodiments.

FIG. 3 represents an example of a device equipped with a connection interface according to the disclosed embodiments. This avionics device 10 comprises at least one electronic board 16 processing data. This electronic board 16 is a standard board, identical to those traditionally used in avionics applications. The device 10 also comprises a coupling interface 11. This coupling interface 11 is a standard electrical interface, identical to the interfaces generally used in standard avionics electrical data communication systems. Thus, the assembly formed of the electrical board 16 and the coupling interface 11 is a standard assembly that constitutes a standard avionics device, as found in avionics electrical data communication systems.

The device 10 of the disclosed embodiments further comprises a connection interface 20. This connection interface 20 comprises an electro-optical converter 22 integrating at least one component converting optical signals into electrical signals and/or electrical signals into optical signals. As explained later, the connection interface can be designed solely for receiving information or solely for transmitting information, especially when the communication bus is one-way. It can also be designed to receive and transmit information, especially when the communication bus is two-way.

When there is a one-way communication of information, the conversion component can be, for example, a light-emitting diode or a laser diode converting the electrical signals into optical signals, or, for example, a phototransistor converting the optical signals into electrical signals.

In the case of a two-way communication of information, two complementary conversion components can be associated to enable optical signals to be converted into electrical signals and electrical signals to be converted into optical signals.

The electro-optical converter 22 further includes electronic circuits associated to the conversion component(s) to ensure their operation.

In a particular embodiment of the disclosed embodiments, means of processing electrical signals, for example amplifiers or circuits shaping signals, can be fitted in the connection interface 20 in order to improve, for example, the quality of the signal sent.

According to the disclosed embodiments, in order to realize the connection interface, electro-optical components can be used that are the most miniaturized possible, compatible with the size of the existing casings of connectors for quadraxial electrical cables.

Figure 4:
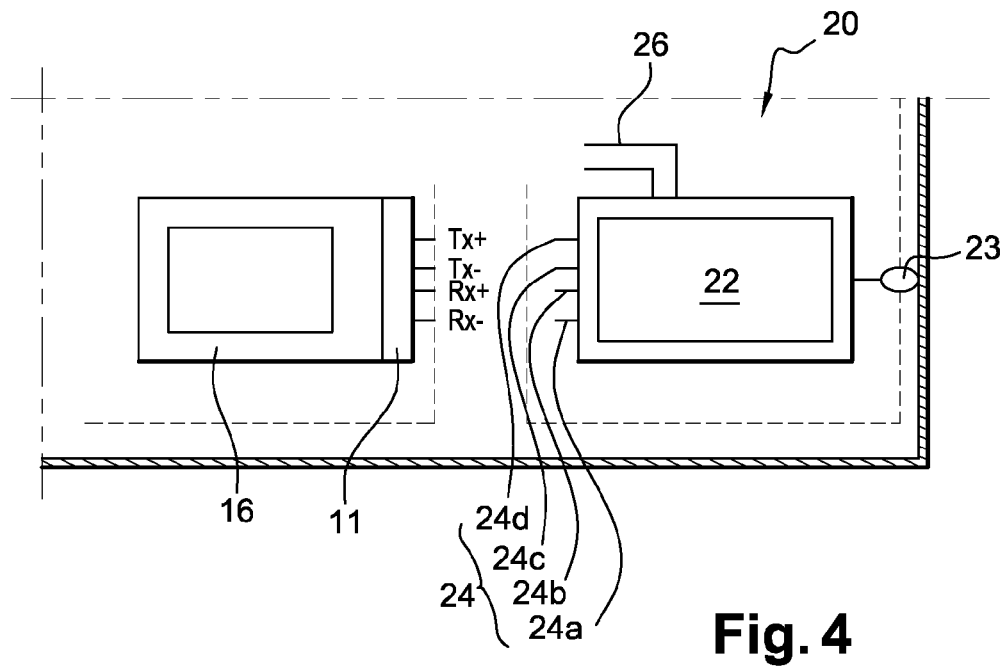
FIG. 4 represents an electro-optical connection interface of an avionics device according to the disclosed embodiments.

In addition to the converter, the connection interface 20 comprises a means of electrical coupling 24 and a means of optical contact 23. As shown in FIGS. 3 and 4, the means of electrical coupling 24 is an electrical connection socket, geometrically and electrically identical to quadraxial-type bus connectors, and complying with the specification required for the avionics device 10 in question. The means of coupling 24 thus makes it possible to connect the connection interface 20 to the coupling interface 11. In particular, when the device 10 is equipped with an NRZI-encoded coupling interface 11, with two contacts Tx+ and Tx− dedicated to transmission and two contacts Rx+ and Rx− dedicated to reception, then the electrical coupling means 24 of the connection interface 20 comprise contacts 24a, 24b, 24c, 24d complementary to the contacts Tx+, Tx−, Rx+ and Rx− of the coupling interface.

The means of optical contact 23 is an optical component ensuring a link with the optical communication means. This optical contact means 23 is installed, on the device of the disclosed embodiments, in the location of and in place of the electrical contact of a standard device. As explained in greater detail later, this optical contact means 23 carries out the reception and transmission of information in optical form from/to the optical communication bus.

The optical contact means 23 is integrated into the connection interface 20. In an embodiment, the connection interface 20 is integrated into a Quadrax contact envelope of mechanical format. The connection interface 20 (on the optical contact 23 side) is intended to be introduced into a complementary connection plug of one of the aircraft's receptacles (compatible mechanical format).

In effect, the whole of the device 10, as it has just been described, can be fitted in a receptacle 30, also called a cradle, permanently installed in the aircraft and linked to the aircraft's electrical system. A receptacle is a housing designed to receive and connect an electronic device within an aircraft. The device can thus be installed on board the aircraft according to the needs of the flight and be removed, for example, for maintenance reasons. A receptacle comprises an internal connection unit, fitted in an irremovable way on one of its sides.

The device of the disclosed embodiments can be installed in the receptacle 30 of an avionics system comprising several devices linked by a network of communication buses. This system comprises at least one optical contact device complying with the disclosed embodiments. It can comprise one or more other optical contact devices or standard electrical contact devices. The various devices are linked by a communication bus network. In this bus network, at least one bus is an optical bus 14.

This optical bus 14 comprises at least one optical cable 12 with at least one optical fiber. In an embodiment, the optical fiber is multifiber. In the preferred embodiment of the system of the disclosed embodiments, the optical bus is monofiber, with a silica fiber. The optical cable is equipped, at its ends, with optical connection plugs 13. Each of these connection plugs comprises an optical termination 15 able to transmit the optical signals by means of the optical contact 23 of the connection interface 20. Such an optical bus 14 is already known for realizing systems transmitting data by means of optical fibers, in fields other than aeronautics. In the system of the disclosed embodiments, the connection plug 13 of the optical bus 14 is mechanically designed so that the optical contact, with the device's contact means 23, is established without loss of information. In an embodiment of the disclosed embodiments, the connection plug of the optical bus has a Quadrax mechanical format, equipped with an optical termination 15.

In the system of the disclosed embodiments, the optical connector 13 of the bus 14 can constitute the internal connection unit of the receptacle 30. In other terms, the connection plug 13 of the optical bus is inserted in a fixed and irremovable way in one wall 31 of the receptacle 30. The connection unit of the receptacle 30 is thus a passive connector, i.e. it only transmits information, without performing any electronic processing. Such a passive connector presents the advantage of making maintenance operations easier, especially on the electro-optical converter, since the device just needs to be removed in order to repair the converter. The maintenance agents do not need to remove the connection plug of the communication bus, sometimes difficult to access.

Such a system presents the advantage of offering a relatively simple optical communication architecture since the optical fiber runs exclusively outside the device. There is no optical fiber crossing said device.

In the case of such a receptacle, when the device 10 is introduced in said receptacle, the connection interface 20 is connected directly onto the connection plug 13 of the optical bus 14. To do this, it is necessary that said connection interface complies with the specification of electrical interfaces expected by the avionics device in question and that fitting on the receptacle 30 is guaranteed, especially through its geometry. When the device is fitted in the receptacle, the connection interface 20 thus carries out the reception, transmission and conversion of signals between the electrical coupling interface 11 and the optical bus 14.

When the bus is one-way, for example for communicating information upstream, then the connection interface 20 only carries out the conversion of electrical signals into optical signals and their transmission to the optical bus 14. When the bus is one-way and carries out downstream information communication, then the connection interface 20 carries out the reception of optical signals and their conversion into electrical signals. In these two cases the optical signals are sent by a single optical fiber or a single bundle of fibers (unlike transmission by electrical bus where they pass over a pair of copper conductors) and the electro-optical converter 22 comprises a single conversion component, designed for the type of conversion to be carried out.

When the bus is two-way, then the connection interface 20 carries out a dual conversion, optical signals into electrical signals and vice versa. In this case, the optical signals being transmitted, i.e. on the upstream channel, and the signals being received, i.e. on the downstream channel, are transmitted over the same optical fiber, or the same bundle of fibers (thus, they pass over two separate pairs of conductors in the case of a quadraxial electrical bus) and the converter 22 comprises two conversion components, each designed for one type of conversion. In this case, the electro-optical converter 22 also comprises at least one optical element separating the upstream and downstream channels. This optical element can be a prism able to separate the reception optical signals and the transmission optical signals so that they are processed differently.

In effect, when the optical communication bus is two-way and simultaneous, the transmission and reception signals are advantageously sent over the same optical fiber or fibers of the optical cable. In order to separate the transmission optical signals from the reception optical signals, these can be sent using optical signals of different wave-lengths, λ1 and λ2, for each of the communication directions, which is obtained by means of conversion components adapted to the wave-lengths chosen and by means of an optical element having a role of wave-length filter. In a preferred embodiment of the disclosed embodiments, the transmission optical signals and the reception optical signals are sent with the same wave-length; their separation is obtained by means of a single wave-length apparatus having a specific geometric configuration for the extraction from and insertion into the optical fiber. Such an apparatus allows the photons to be withdrawn and inserted according to their direction on the optical fiber axis.

Another aspect of the connection interface 20 relates to the electrical powering of the components of the electronics incorporated in said interface. The components currently used to realize conversions from electrical signals to optical signals or vice versa generally require a low-voltage direct current power supply (several volts). Therefore such an electrical power supply needs to be brought to the connection interface 20. This electrical power supply can be realized by means of a power supply lead 26 connected to a source of current adapted to the needs of the electronics incorporated in said interface. For example, the power supply lead 26 is equipped at its free end with an electrical contact able to be inserted into an aperture of the receptacle 30, said aperture corresponding to an electrical contact point where the looked-for current is available. Generally, the designers of avionics systems provide, on the receptacles, free locations in reserve on which contacts can be wired to bring the looked-for current from the plane's electrical power. The connection interface's electrical power supply can also be obtained from the receptacle's internal connection unit. An implementation in which the power is sent over the signal (Power Over Ethernet type) can also be envisaged.

The connection interface, in the device as described previously, can be removable. In effect, as this connection interface is installed in the electrical coupling interface, in the same way as a standard electrical bus may be installed in a standard device, it is understood that said connection interface can be removable. It can therefore by installed on a standard device, transforming this device into an optical contact device.

Furthermore, the connection interface can be realized in the mechanical form of a standard connector, such as the ARINC 600 connector, which allows standard receptacle inserts to be used. According to the disclosed embodiments, this connector integrates an optical contact that allows the optical link to be coupled between the optical bus and the device during connection/disconnection operations of the device, for example for maintenance reasons.

What is claimed is:

1. An avionics device configured to be installed on board an aircraft, the avionics device comprising:
   a receptacle comprising at least one wall having an opening defined therein;
   means for processing information having an electrical coupling, the means configured to be installed in the receptacle;
   an electro-optical connector interface configured to at least one of receive and transmit information through an optical bus and coupled to the means for processing information; and
   an optical bus comprising:
      an optical cable; and
      an optical connector at an end of the optical cable;
   wherein the optical connector is inserted in the at least one wall of the receptacle in a fixed and irremovable way;
   wherein the optical connector is configured to be releasably coupled with the electro-optical connector interface when the means for processing information is installed in the receptacle;
   wherein the electro-optical connector interface comprises:
   an electrical coupling interface for connecting to the electrical coupling of the means for processing information, and configured to at least one of transmit and receive information in the form of electrical signals through the electrical coupling, the electrical coupling interface comprising a means for electrical coupling configured to be inserted into the electrical coupling of the means for processing information; and
   an optical connection interface for connecting to the optical bus, and for at least one of transmitting and receiving information in the form of optical signals through the optical bus, the optical connection interface comprising a means for optical contact configured to be connected to the optical bus, the optical connection interface configured to at least one of:
      convert electrical signals from the electrical coupling interface into optical signals and transmit the optical signals to the optical connection interface, and
      convert optical signals from the optical connection interface into electrical signals and transmit the electrical signals to the electrical coupling interface,
   and
   wherein the electro-optical connector interface is configured to at least one of convert the electrical signals into optical signals and convert the optical signals into electrical signals.

2. The device according to claim 1, wherein the electro-optical connector interface comprises at least one component coverting the electrical signal into an optical signal.

3. The device according to claim 1, wherein the electro-optical connector interface comprises at least one component converting the optical signal into an electrical signal.

4. The device according to claim 1, wherein the electro-optical connector interface comprises at least one optical element configured to separate an information transmission channel from an information reception channel.

5. The device according to claim 1, wherein the electro-optical connector interface comprises means for being powered by an external energy source.

6. An avionics system installed on board an aircraft, comprising:
   at least a first device and a second device, a first receptacle and a second receptacle comprising at least first and second walls, respectively, said first and second walls having a first and a second opening defined therein, respectively;

an optical bus comprising first and second ends, said first and second ends comprising a first optical connection plug and a second optical connection plug, respectively, and configured to connect the first and second devices to one another;

wherein the first and second optical connection plugs are inserted in the at least first and second walls, respectively, in a fixed and irremovable way;

first and second means for processing information having a first electrical coupling and a second electrical coupling, respectively, said first and second means installed in the first and second receptacles, respectively; and a first electro-optical connector interface and a second electro-optical connector interface configured to at least one of receive and transmit information through the optical bus, wherein the first and second optical connection plugs are configured to be releasably coupled with the first and second electro-optical connector interfaces, respectively, when the first and second means are installed in the first and second receptacles, respectively, wherein each of the first and second electro-optical connector interface comprises:

an electrical coupling interface for connecting to the electrical coupling of the means for processing information, and configured to at least one of transmit and receive information in the form of electrical signals through the electrical coupling, the electrical coupling interface comprising a means for electrical coupling configured to be inserted into the electrical coupling of the means for processing information; and an optical connection interface for connecting to the optical bus, and for at least one of transmitting and receiving information in the form of optical signals through the optical bus, the optical connection interface comprising a means for optical contact configured to be connected to the optical bus, the optical connection interface configured to at least one of:

convert electrical signals from the electrical coupling interface into optical signals and transmit the optical signals to the optical connection interface, and convert optical signals from the optical connection interface into electrical signals and transmit the electrical signals to the electrical coupling interface, and wherein the electro-optical connector interface is configured to at least one of convert the electrical signals into optical signals and convert the optical signals into electrical signals.

7. An aircraft comprising at least one avionics device, the avionics device comprising:

a receptacle comprisign at least one wall having an opening defined therein;

means for processing information having an electrical coupling, the means configured to be installed in the receptacle; and an electro-optical connector interface configured to at least one of receive and transmit information through an optical bus and coupled to the means for processing information; and an optical bus comprising:
an optical cable; and
an optical connector;

wherein the optical connector is inserted in the at least one wall of the receptacle in a fixed and irremovable way;

wherein the optical connector is configured to be releasably coupled with the electro-optical connector interface when the means for processing information is installed in the receptacle;

wherein the electro-optical connector interface comprises:

an electrical coupling interface for connecting to the electrical coupling of the means for processing information, and configured to at least one of transmit and receive information in the form of electrical signals through the electrical coupling, the electrical coupling interface comprising a means for electrical coupling configured to be inserted into the electrical coupling of the means for processing information; and an optical connection interface for connecting to the optical bus, and for at least one of transmitting and receiving information in the form of optical signals through the optical bus, the optical connection interface comprising a means for optical contact configured to be connected to the optical bus, the optical connection interface configured to at least one of:

convert electrical signals from the electrical coupling interface into optical signals and transmit the optical signals to the optical connection interface, and convert optical signals from the optical connection interface into electrical signals and transmit the electrical signals to the electrical coupling interface, and wherein the electro-optical connector interface is configured to at least one of convert the electrical signals into optical signals and convert the optical signals into electrical signals.

\* \* \* \* \*